United States Patent [19]
Games et al.

[11] 3,758,758
[45] Sept. 11, 1973

[54] ROTATIONAL STATISTICAL VIBRATION ANALYSIS EMPLOYING SIDEBANDS AND/OR WEIGHTING

[75] Inventors: John E. Games, Granby; Albert J. Wyrostek, East Windsor, both of Conn.

[73] Assignee: United Aircraft Corporation, East Hartford, Conn.

[22] Filed: Mar. 10, 1972

[21] Appl. No.: 233,654

[52] U.S. Cl............... 235/151.3, 73/67.2, 73/71.4, 324/77 A, 340/261
[51] Int. Cl....................... G06f 15/34, G01m 7/00
[58] Field of Search............ 235/151, 151.3, 151.31; 73/67, 67.1, 67.2, 71.4; 324/77 A, 77 B; 340/261

[56] References Cited
UNITED STATES PATENTS

| | | | |
|---|---|---|---|
| 3,400,578 | 9/1968 | Frarey et al. | 73/67 X |
| 3,544,775 | 12/1970 | Bergland et al. | 235/151.31 |
| 3,603,140 | 9/1971 | Spencer | 324/77 A X |
| 3,455,149 | 7/1969 | Foster et al. | 340/261 X |
| 3,554,012 | 1/1971 | Söhoel | 73/67.2 |
| 3,677,072 | 7/1972 | Weichbrodt et al. | 73/67 |
| 3,070,995 | 1/1963 | Broder et al. | 73/67 |

Primary Examiner—Felix D. Gruber
Assistant Examiner—Jerry Smith
Attorney—Melvin Pearson Williams

[57] ABSTRACT

A method of statistical analysis of the vibrational characteristics of rotary machinery includes a mechanical analysis of the involved machinery to identify pertinent frequencies therein, such as gear mesh frequencies, together with sidebands of pertinent frequencies created by FM modulation due to imperfections of parts; selective, narrow band filtering of vibrational response of the machinery, at frequency bands including fundamental frequencies, harmonics thereof and certain upper and lower sidebands of each; statistical analysis to determine standard deviations from normal responses and choice of integral numbers thereof to be taken as indicative of degradation; and weighting of the results of the test in accordance with analytical evaluation of the various responses in indicating the health of the apparatus under test. A typical system for performing vibrational analysis in a helicopter, with on-line airborne equipment or ground based equipment, employing a general purpose digital computer, and typical logic flow of a related general purpose computer are also disclosed.

4 Claims, 2 Drawing Figures

ROTATIONAL STATISTICAL VIBRATION ANALYSIS EMPLOYING SIDEBANDS AND/OR WEIGHTING

BACKGROUND OF THE INVENTION

1. Field of Invention

This invention relates to statistical vibrational analysis, and more particularly to improvements therein employing FM modulation sideband analysis and/or weighting of results.

2. Description of the Prior Art

One type of analysis of the vibrational characteristic of rotary machinery known to the art monitors the vibration (acceleration) of various specific points on the machinery as the machinery rotates. Filtering is used to select only frequency bands which are known to bear some relation to the operation of the equipment. Magnitudes of acceleration which can be expected of the device when functioning properly with good parts vary somewhat from device to device, so that statistical analysis, similar to that used in quality control analyses, is employed to separate accelerations which can be expected, statistically, to indicate abnormal operation from that which can be expected, statistically, to indicate normal operation.

Methods of vibrational analysis known to the art may vary somewhat. For instance, one form comprises monitoring expected significant frequency bands (by use of proper filters), such as shaft rotation speeds; another method uses a broad spectral analysis of all of the vibration which occurs below a given upper frequency (which may be on the order of 5 KHz). However, the method of monitoring distinct, selected frequencies as is known to the prior art has failed to produce useful results on a statistical basis over a large sample of usage, particularly where analysis of individual components, not connected to other components with which they must work, is utilized as a basis for determining the health of the various parts of a system when interconnected for operation. This is due in part to the intercoupling of vibrational responses from one component into another, and the masking of responses in one component by those in another. On the other hand, it has been found that the use of broad spectral analysis has not solved these deficiencies due to the fact that there is such a plethora of redundant information that it has been found to be impossible to extract meaningful information from dispositive results.

In addition, the collection of vast amounts of data to be analyzed in any fashion desired at a later date by large scale computational facilities is impractical in on-line situations, where during the normal operation of the device its health is periodically checked by statistical analysis, and particularly in airborne installations where the amount of data which may be stored and/or manipulated must be severly curtailed due to space and weight considerations.

Attempts heretofore made in reducing the amount of information which must be stored in on-line airborne vibrational analysis equipment have usually included the reduction of the number of bands which are fully monitored. To provide this decrease, prior methods of data reduction have increased the bandwidth of the filters (or comparable digital analysis) thereby to maintain the frequency components monitored, while reducing the number of bands for which information must be stored. However, this has caused the marking of relatively narrow band effects at certain frequencies amongst the noise of all of the freqeuncies within the band. For instance, consider two bands, one having a bandwith only one one-hundredth as great as the bandwidth of the other band. Assuming the background noise is random, its level will be ten times greater in the case of the broad band, thereby effectively masking any low level narrow band response.

SUMMARY OF INVENTION

The object of this invention is to provide significant improvements in vibrational analysis of rotary equipment.

The present invention is predicated on our discovery that there is only a very small energy content of vibrational response in some components of a system of rotary equipment which are most likely to fail, or otherwise are desired to be used as indications of system health; and that the alterations therein (as a result of partial component degradation or total failure) may be insufficient to provide an adequate indication in the spectral analysis of vibrational responses of the system so as to determine the presence of degradation or failure therein. This is particularly true of bearings.

This invention is further predicated on our discovery that characteristics of bearings cause gears rotatably disposed thereon to exhibit vibrational response not only at the gear mesh frequency, but at sidebands thereof which are generated by FM modulation of the gear rotational speed, and that the amplitude of vibrational response at fundamental gear mesh frequency, harmonics thereof and the sidebands of each are affected significantly by variations in the bearings upon which the gears are rotatably disposed.

In accordance with the invention, a method of rotational vibration analysis comprises utiliziing at least two sidebands of gear mesh frequency in the analysis of the health of rotary equipment. In further accord with the present invention, a method of vibrational analysis of rotary equipment includes use of frequency bands of second or higher-ordered harmonics of certain pertinent frequencies, including the sidebands thereof, to eliminate interference between responses of different components of the rotary equipment, thereby to separate and provide a clear indication of the individual effects thereof. In still further accord with the present invention, the occurrence of excessive vibration in selected frequency bands in a spectrum thereof being analyzed is weighted to provide less reliance upon frequency bands which may bear identity or strong relationship with other frequency bands, thereby to reduce the effect of masking of certain responses as a result of intercoupling of various components, or to enchance the recognition of certain frequency bands found to be more indicative of equipment health, or both. In accordance still further with the present invention, a method of vibration analysis of rotary equipment includes storage and comparison with selected functions of standard deviations of vibrational responses carefully selected for their known value in analyzing equipment health, thereby to reduce storage and enhance the potential for use in on-line and/or airborne equipment.

The present invention takes advantage of the high energy content of vibrational responses in gear mesh frequency bands, harmonics, and sidebands thereof. The invention further provides greater credibility in the vibrational analysis and the conditions implied therefrom. The invention provides a high degree of statistical assurance with a relatively low amount of total information gathered and processed, thereby to simplify and minimize the complexity and the amount of equipment required for a high degree of reliability in the results of vibrational analysis.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
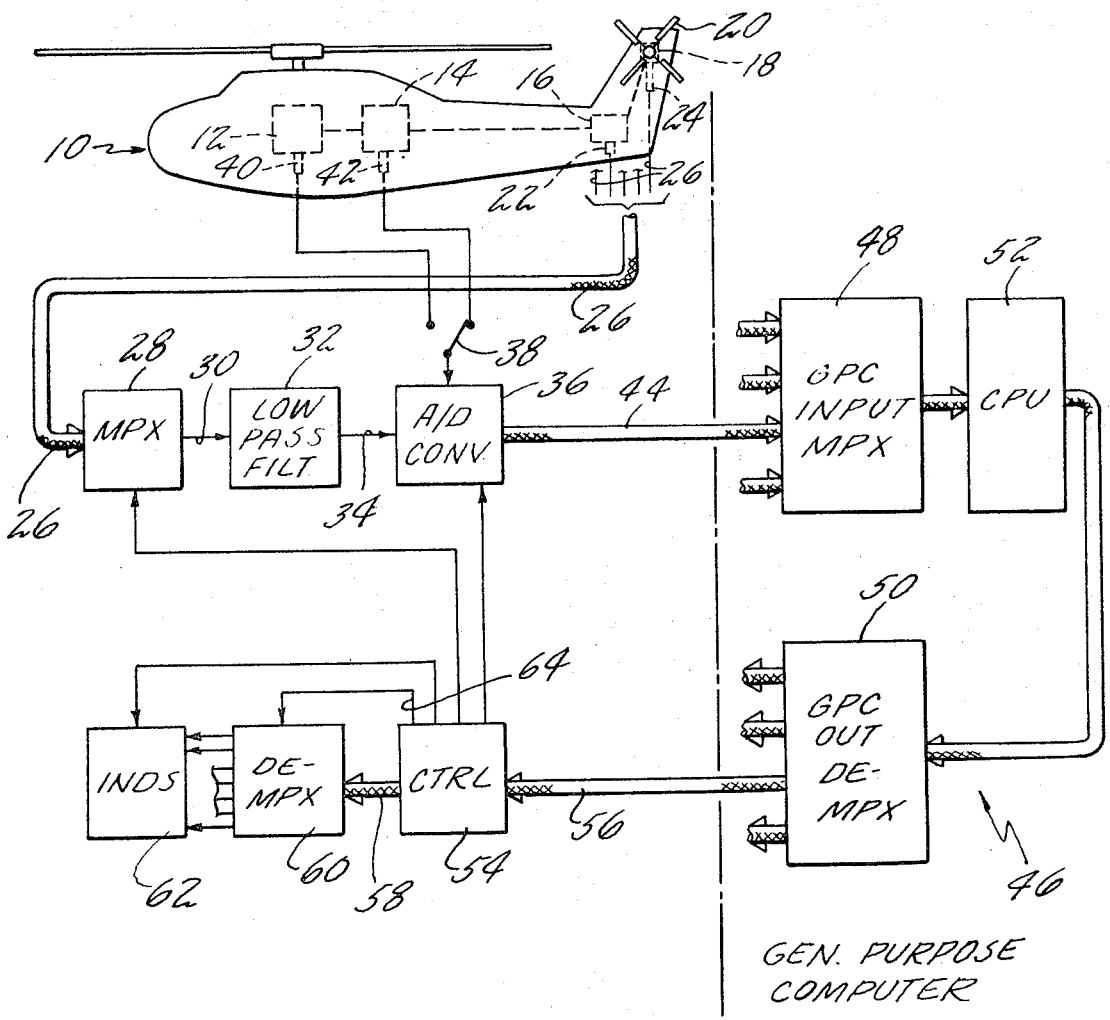
FIG. 1 is a simplified schematic block diagram of a typical system which may be employed to practice the method of the present invention.

As referred to briefly hereinbefore, prior statistical vibration analysis has typically resulted in the collection of so much information that the extraction of pertinent data therefrom has been nearly impossible on a long range, statistically reliable basis. Further, it has been found that the vibrational responses in one component of a rotary equipment system, such as a gear train, are intercoupled with vibrational responses of other components, which have a tendency to mask those responses which are indicative of the condition, or health, of the various components in the system.

The method of the present invention includes a theoretical mechanical analysis of the system to be tested to determine the relationship between vibrational frequencies and the rotary speed of the system and its components which may be indicative of component health. As an example, consider the tail rotor gear train of a typical small helicopter of a type widely used by the U. S. Army, as illustrated in simplified form in the upper left-hand corner of FIG. 1. Therein, the helicopter 10 includes an engine 12 driving a primary gearbox or transmission 14 which is coupled to a 42° gearbox 16 which in turn drives a 90° gearbox 18 for rotating the tail rotor 20 of the helicopter 10. Accelerometers 22, 24, or other suitable sensors, are suitably disposed at appropriate points on the 42° gearbox 16 and the 90° gearbox 18, respectively. There may be more than one sensor on each gearbox (for instance, one mounted near each distinct shaft) if desired. Additional sensors may be mounted elsewhere on or within the helicopter 10.

As an example illustrating the significance of the present invention, the vibrational response of the 42° gearbox 16 and the 90° gearbox 18 includes: fundamental gear mesh frequencies, second harmonics of the gear mesh frequencies, and sidebands of the fundamental and second harmonic gear mesh frequencies (in Hz) for the shaft speed between the 42° gearbox 16 and the 90° gearbox 18 of 72 Hz (72 revolutions per second or 4320 RPM) as shown in Tables I and II. The fundamental gear mesh frequency of 1944 Hz for the 42° gearbox 16 results from it having 27 teeth, and the fundamental gear mesh frequency of 1080 Hz for the 90° gearbox 18 results from that gear having 15 teeth. Examination of Tables I and II will show that the sidebands, both upper and lower, bear a center frequency separation with respect to each other (and the fundamental) of 72 Hz (the shaft speed). An important aspect of the present invention is our discovery that these sideband components (out to at least ten sidebands) exist with significant amplitude and energy content and that the magnitudes of the sidebands bear a direct, significant relationship to the characteristics of the bearings upon which the gears are rotatably disposed. Thus, the first aspect of the present invention is to determine the health of bearings (upon which gears are disposed) by monitoring the effect which they have on the sidebands of the gear mesh frequencies related thereto. The second aspect of the present invention can be seen by examination of Table II, wherein the second harmonic of the fundamental gear mesh frequency (3,888 Hz and 2,160 Hz) are exactly twice the primary frequency (as is known in the art), but the sidebands are, however, still separated from the second harmonic and from each other by the

TABLE I

| 42° Gearbox 16 | | 90° Gearbox 18 |
|---|---|---|
| 1224* | | 360 |
| 1296 | | 432 |
| 1368 | | 504 |
| 1440 | | 576 |
| 1512 | LOWER | 648 |
| 1584 | SIDEBANDS | 720 |
| 1656 | | 792 |
| 1728 | | 864 |
| 1800 # | | 936 |
| 1872 | | 1008 |
| 1944 | FUNDAMENTAL | 1080 |
| 2016 | | 1152 |
| 2088 | | **1224 |
| 2160 | | 1296 |
| 2232 | | 1368 |
| 2304 | UPPER | 1440 |
| 2376 | SIDEBANDS | 1512 |
| 2448 | | 1584 |
| 2520 | | 1656 |
| 2592 | | 1728 |
| 2664 | | ##1800 |

TABLE II

| 42° Gearbox 16 | | 90° Gearbox 18 |
|---|---|---|
| 3168 | | 1440 |
| 3240 | | 1512 |
| 3312 | | 1584 |
| 3384 | | 1656 |
| 3450 | LOWER | 1728 |
| 3528 | SIDEBANDS | 1800 |
| 3600 | | 1872 |
| 3762 | | 1944 |
| 3744 | | 2016 |
| 3816 | | 2088 |
| 3888 | 2nd HARMONIC | 2160 |
| 3960 | | 2232 |
| 4032 | | 2304 |
| 4104 | | 2376 |
| 4176 | UPPER | 2448 |
| 4248 | SIDEBANDS | 2520 |
| 4320 | | 2592 |
| 4392 | | 2664 |
| 4464 | | 2736 |
| 4536 | | 2808 |
| 4608 | | ##2880 | shaft rotational speed (72 Hz). Thus it is possible to shift the entire spectrum of sidebands so as to be centered about a point which is twice the fundamental frequency, without broadening the spectrum of sidebands. That is to say, the difference between the tenth upper sideband and the tenth lower sideband is twenty times the shaft frequency (1,440 Hz) for the second harmonic as well as for the fundamental frequency. This is true for both gearboxes 16, 18 since both operate at the same shaft speed which determines the sideband separation.

In accordance with the invention, this discovery is utilized to overcome interference between sidebands of intercoupled gears. For instance, in Table I it can be seen that the 42° gearbox 16 has a tenth lower sideband centered at 1,224 Hz, and the 90° gearbox 18 has a second upper sideband centered at 1,224 Hz. These are identified by * and **, respectively in Table I. Similarly, the second lower sideband ( # ) of the 42° gearbox 16 is centered at the same frequency (1,800 Hz) as the tenth upper sideband ( # # ) of the 90° gearbox 18. However, if the filtering is chosen so as to monitor the second harmonic and its sidebands (instead of the fundamental and its sidebands), there are no interactive common frequencies among the sidebands of the two gearboxes (in the first 10 sidebands) since the tenth lower sideband of the 42° gearbox 16 has a center frequency of 3,160 Hz which is higher than the center frequency (2,872 Hz) of the tenth upper sideband of the 90° gearbox 18.

We have further discovered that the amount of energy, and the manner of change of the amount of energy (generally an increase) in the second order harmonic and sidebands is significant and suitable for determining component health. As described briefly hereinbefore, since the sidebands are separated from the fundamental or from the second harmonic and from each other (whether relating to the fundamental or the second harmonic) by a frequency which is equal to the rotational speed of the related shaft, it is possible to arrange for digital or analog filtering simply as a function of shaft speed. Thus for the 42° gearbox 16, filtering for the fundamental frequency is simply 27 times shaft speed. Filtering for the first upper sideband hereof is (27 + 1) times shaft speed; filtering for the second upper harmonic is (27 + 2) times shaft speed, and so forth. In other words, in each case (that is for any gearbox or for fundamentals or second harmonics) each band of interest has a center frequency which is an integral number of shaft speeds, the integral number depending upon the number of teeth in the gear, the order of the harmonic, and the order of the sideband.

Another aspect of the present invention provides an alternative in the method of handling the interaction between sidebands (*, # ) illustrated in Table I. This aspect of the present invention comprises the use of weighting of responses so as to reflect the value thereof in determining condition or health of rotary components or systems. For accelerations having magnitudes in excess of one or more standard deviations of the normal magnitude for a healthy part, as determined from prior analysis and empirical results, one may register excessive vibration in non-interactive sidebands with a higher number than those having sidebands which are interactive with other sidebands. In such a case, healthy equipment is recognized by relatively low total numbers and progressively unhealthier equipment has progressively higher numbers.

FIG. 1 illustrates exemplary digital apparatus which may be utilized in the practice of the present invention. Therein, the sensors 22, 24 are connected (along with other sensors if desired) by suitable lines 26 to a multiplexer 28 which selects the one sensor 22, 24 which is to be sampled. The output of the multiplexer 28 is connected by a line 30 to a low pass filter 32 so as to frequency limit the wave, thereby to reduce the noise content and the effect known as aliasing which can occur as a result of high frequency components (in excess of the upper frequency components which are desired to be analyzed in the vibrational analysis). The low pass filter may, typically, have an upper break-point frequency on the order of 5 KHz. The output of the low pass filter is connected by a line 34 to an analog to digital converter 36, which is also connected by means of a switch 38 to either of two tachometers 40, 42. The tachometers 40, 42 generate signals indicative of the shaft speed of the engine 12 and of the main gearbox or transmission 14. In the example herein, the tachometer 42 would be utilized to provide an indication of the speed of the shaft driving the 42° gearbox 16. The indication of shaft speed is used to control the clock of the analog to digital converter 36 so as to vary the center frequency of the filtering bands as a function of shaft speed, in a manner described with respect to Tables I and II hereinbefore. The utilization of an A/D converter clocked with main shaft speed is a well known expedient in the art and forms no part of the present invention. As is true in vibrational analyses known to the art, the multiplexer 28 maintains a connection between the low pass filter 32 and one of the sensors 22, 24 to provide sampling of the complex waveform presented by the sensor 22, 24 at a rate which is at least twice the frequency of the highest frequency component in the waveform to be analyzed, at sampling intervals which are inversely proportional to the bandwidth (or effective bandwidth) of the frequency bands which are to be analyzed. For instance, in the example herein, the bandwidth of the bands may typically be 14 Hz, so that the sampling interval is one fourteenth of a second. This means that every one fourteenth of a second, the A/D converter 36 will digitize the numerical value of the magnitude of the signal at its input on the line 34. The number of samples taken in any one sampling interval must be, as is well known in the art, sufficiently large so as to present a clear picture of the complex waveform which is to be analyzed, which is a function of the maximum frequency to be analyzed. In the example herein, a Fast Fourier transform analysis is contemplated, so that the number of samples taken is chosen to correspond with the requirements of the particular computer algorithm in use. The present example, 1,024 samples are taken 32 times. Thus, for each setting of the multiplexer 28, the output of the A/D converter 36 will comprise a series of digitized numbers which are fed over a trunk of lines 44 to a general purpose computer 46, and more particularly to an input multiplexer 48. The input multiplexer 48 may typically comprise a portion of an input/output unit which may include an output demultiplexer (or distributor) 50 of the type which is included in substantially all general purpose computers currently available. Receiving of the digital numbers at the input 48 of the general purpose computer is under control of a program within the central processing unit 52. Similarly, the outputing of results determined by performing a Fast Fourier transform, storage of the results, and comparison with standard deviations, including weighting of results, is controlled by the CPU 52 so as to provide analysis results to a control unit 54 over a trunk of lines 56, which may in turn be applied over a trunk of lines 58 to a demultiplexer or distributor 60 for application to suitable indicators 62, or other utilization apparatus. The control unit 54 also receives control information over the trunk of lines 56 so as to control the apparatus associated therewith, including providing addresses or sensor designations to the multiplexer 28, resetting the A/D converter 36 at appropriate times, providing addresses or indicator designations to the demultiplexer 60, and resetting or otherwise controlling the indicator 62 (or other utilization apparatus). These controls over the associated apparatus are represented by a plurality of lines 64.

Figure 2:
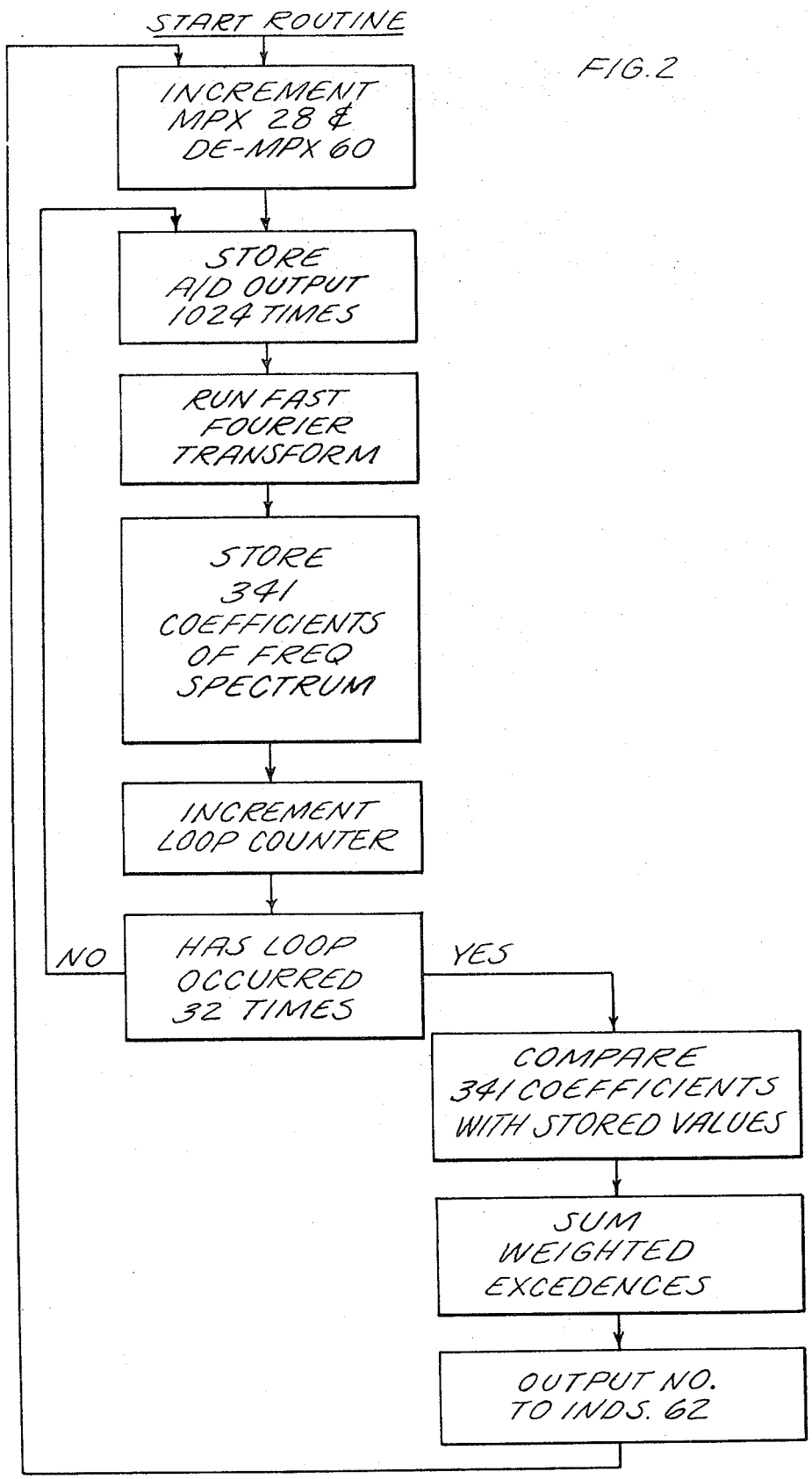
FIG. 2 is a simplified logic flow diagram of the functions which may be performed by a general purpose computer in performing the method of the present invention.

THe manner in which the apparatus of FIG. 1 may be operated, in accordance with well known techniques and processes, is briefly illustrated in FIG. 2. Therein, the start of the vibrational analysis routine is at the top of FIG. 2. The method of the invention may be practiced by a general purpose ground-based computer, or by a general purpose airborne computer which may also, for instance, comprise part of an airborne integrated data system, or even a portion of a fuel control or an engine control employing a multi-purpose digital computer. Of course, the method of the present invention may equally well be practiced by a computer which performs no other function and is dedicated to the vibration analysis. In any event, through programming techniques well known in the art, the starting of a given vibration analysis routine will dedicate the computer for a period of time required to perform the routine (which may, for instance, be on the order of a half a minute). The first step is to increment the multiplexer 28 and demultiplexer 60 so as to specify the first sensor of a sequence of sensors, the analysis of which is to be performed. This is done by outputting a word through the GPC output demultiplexer 50 through the control unit 54 which senses within the word a command to increment the multiplexer, which the control unit 54 effects over one of the lines 64. The multiplexer is then connected to the next sensor to be analyzed. The magnitude of accelerations sensed by the sensors 22, 24 is a complex time-varying waveform which is passed through the low pass filter 32 so as to frequency band limit the content of the complex waveform prior to it passing over the line 34 to the A/D converter 36. At a suitable clock rate determined by the speed of either the engine 40 or the main gearbox 42 (as determined by the switch 38) the A/D converter will sample the waveform at the sampling rate determined by the clock which is controlled by one of the tachometers 40, 42. For each sampling, a digital word is passed over the trunk of lines 44 through the input multiplexer 48 to the CPU 52 and is stored. In the present example, each waveform is sampled 1,024 times, and the output of the A/D converter for each sampling time is separately stored. Then the computer program causes a Fast Fourier transform to be performed on the complex wave as represented by the 1,024 digital numbers in storage. The performance of a Fast Fourier transform by computers is well known, as is illustrated in a number of articles, including the following: 1). W. M. Gentlemen, G. Sande, "Fast Fourier Transforms For Fun And Profit," Proceedings 1966, Fall Joint Computer Conference, Pgs. 563-578; 2). W. T. Cochrane et al, "What Is The Fast Fourier Transform?," IEEE Transactions On Audio And Electro Acoustics, June 1967, Pgs. 45-55; 3). G. D. Bergland, "A Guided Tour Of Fast Fourier Transforms," IEEE Spectrum, July 1969, Pgs. 41-52; 4). R. R. Shively, "A Digital Processor To Generate Spectra In Real Time," IEEE Transactions On Computers, May 1968, Pgs. 485-491. The Fast Fourier transform is an iterative process which will result in generation of a series of coefficients which represent the magnitude of the discrete frequency components of which the complex waveform is comprised. The specific frequency components which are determined, iteratively, by the Fast Fourier transform algorithm are typically in excess of the number of frequency components or bands required to analyze the condition or health of a component part of a rotary system with which the related sensor corresponds.

In the present example, 341 of the frequency bands for which coefficients of magnitude are determined by the Fast Fourier transform algorithm are temporarily stored (in addition to the temporary storage inherent within the Fast Fourier transform algorithm). In addition, however, in order to provide a high statistical credibility to the coefficients which are determined by the Fast Fourier transform, the transform may be performed any desirable number of times for each sensor, summing the results each time (with or without averaging, as may be desired). Therefore, the computer program may provide for incrementing a loop counter to count the number of times that the basic fourier transform loop has occurred, and repeat the process of digitizing the complex waveform at the sampling rate, determining coefficients by a Fast Fourier transform, and storing the results. In the present example, when the loop has occurred 32 times then comparisons are made with stored coefficient values of the pertinent bands of the total (341) bands calculated. For each of the pertinent coefficients, which represent the magnitude of vibration at a given frequency band, if the coefficient exceeds more than one or some other integral number of standard deviations from the norm (as is determined empirically in accordance with techniques of vibration analysis well known in the prior art), a number is added into a counter. The number can be any integral number to provide suitable weighting in accordance with the value that such an exceedance has in analyzing the condition or health of the component part related to the sensor for which the coefficients have been determined. As an example, most useful coefficients could be associated with a number such as two, indicating that any exceedance relating to that frequency band would cause the health rating to be degraded by a value of two in the total count. However, conditions very indicative of health may be associated with a count of four, and conditions which are interactive with other conditions in the system (as illustrated in Table I) may be associated with a count of one. In any event, there counts are summed for all of the pertinent bands relating to the given sensor to provide an overall number which is indicative of the condition or health of the component part related to the sensor. In such a case the higher the number the less healthy is the part; the lower the number, the more healthy is the part. Many bands can be rated zero, thereby being unused, if found to be of no analytical significance.

The number is outputed through the GPC output demultiplexer 50, through the control unit 54, together with code words indicating that it is an output number. The demultiplexer 60 will steer this number to the correct indicator 62, which may comprise no more than a legible digital counter. On the other hand, if desired, the output of the demultiplexer 60 could be passed through a digital to analog converter so as to provide an analog indication of the health of the given unit. If the indicators are types that require resetting prior to establishment of a new reading therein, the control unit 54 can provide a signal on one of the lines 64 for resetting of the associated indicator prior to passing the new number through demuliplexer 60 thereto. Once the indicator 62 has been set to show the health of the component part related to the sensor connected to the multiplexer 28, the routine for a given sensor is complete, and may now be repeated, successively, for different sensors simply by returning to the start of the routine (upper part of FIG. 2) and incrementing both the multiplexer 28 and the demultiplexer 60 to the next sensor in the sequence.

The method of the present invention may also be practiced by analog apparatus using filters (either active or passive) to determine coefficients of the different frequency bands of interest. In fact, the invention may be practiced utilizing analysis equipment which is available in the art, such as a wide variety of models sold nationally by Federal Scientific, New York City. All of this is immaterial to the present invention.

In the method of the present invention, mechanical analysis of the rotary equipment to indicate various frequency bands, including harmonics and sidebands, which may be of interest in the analysis of the health condition of given components of the system, or of an overall system, may be performed in accordance with well known teachings in the art. As an example, bearings may be analyzed in accordance with teachings set forth in a work of A. Harris Tedric *Rolling Bearing Analysis*, John Wiley and Sons, 1966. Additional useful analysis techniques are set forth in an Army contract report by the Bell Helicopter Company entitled Automatic Inspection *Diagnostic and Prognostic System* (AIDAPS) *Test Bed Program-Task II*, Report No. 299-099-521, dated Feb. 12, 1970. The required techniques are all well known in the art, and do not form a part of the present invention.

Thus there has been described, in a method of vibration analysis which includes providing a fair statistical sample of coefficients of frequency bands of the complex output wave of a vibration sensor, where the selected bands may be chosen as a result of mechanical analysis of the involved system or components, determining the number of standard deviations from normal responses to be recognized as indicating abnormal operation, the improvement of utilizing sidebands of gear mesh frequencies; and in such a method, the improvement of using harmonics of designated frequencies to avoid interactive bands; the invention further comprises, in such a vibration analysis method, utilizing weighting of the occurrence of exceedances to reflect interactive bands and to reflect bands known to be more indicative of equipment health than others.

Although the invention has been shown and described with respect to a preferred embodiment thereof, it sould be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. In a method of vibrational analysis which includes comparision of coefficients of selected frequency bands, in a complex wave representing the magnitude of vibration at a point on rotary machinery, with values representing magnitudes of vibration taken as limits of magnitude of acceptable vibration, the improvement comprising:
    determining a distinct coefficient for each of a plurality of frequency bands, at least two of said frequency bands comprising respective sidebands of a fundamental or harmonic gear mesh frequency.

2. In the method of claim 1, the additional improvement which comprises weighting the occurrence of exceedances of coefficients above the upper limit of acceptable performance magnitudes.

3. In a method of vibrational analysis, for determination of not only faulty gears, but faulty bearings, which includes comparison of coefficients of selected frequency bands, in a complex wave representing the magnitude of vibration at a point on rotary machinery, with values representing magnitudes of vibration taken as limits of magnitude of acceptable vibration, the improvement comprising:
    determining a distinct coefficient for each of a plurality of frequency bands, at least two of said frequency bands comprising respective sidebands of a fundamental or harmonic gear mesh frequency.

4. In the method of claim 3, the additional improvement which comprises weighting the occurrence of exceedances of coefficients above the upper limit of acceptable performance magnitudes to allow fault isolation, and greatly reduce the amount of data storage by rating most bands at zero.

* * * * *